US012650047B2

(12) United States Patent
Nesmith et al.

(10) Patent No.: US 12,650,047 B2
(45) Date of Patent: Jun. 9, 2026

(54) TRACK SYSTEM FOR USE WITH AN OPERATING ELEMENT IN AN ARCHITECTURAL-STRUCTURE COVERING

(71) Applicant: Hunter Douglas Inc., New York, NY (US)

(72) Inventors: Sam Nesmith, Broomfield, CO (US); Ronald Holt, Westminster, CO (US); Joshua N. Smith, Broomfield, CO (US); Stephen T. Wisecup, Niwot, CO (US)

(73) Assignee: Hunter Douglas Inc., New York, NY (US)

( * ) Notice: Subject to any disclaimer, the term of this patent is extended or adjusted under 35 U.S.C. 154(b) by 156 days.

(21) Appl. No.: 18/510,776

(22) Filed: Nov. 16, 2023

(65) Prior Publication Data

US 2024/0167333 A1 May 23, 2024

Related U.S. Application Data

(60) Provisional application No. 63/427,160, filed on Nov. 22, 2022.

(51) Int. Cl.
*E06B 9/32* (2006.01)
*E06B 9/42* (2006.01)

(52) U.S. Cl.
CPC . *E06B 9/42* (2013.01); *E06B 9/32* (2013.01)

(58) Field of Classification Search
CPC ......... E06B 2009/425; E06B 2009/785; E06B 9/326
See application file for complete search history.

(56) References Cited

U.S. PATENT DOCUMENTS 187,867 A * 2/1877 Knapp ...................... E06B 9/60 160/314
1,913,902 A * 6/1933 Schofield .................. E06B 9/50 160/256
2,225,280 A * 12/1940 Sample ..................... E06B 9/50 160/265
2,554,331 A * 5/1951 Hunter .................... E06B 9/326 474/205
3,129,040 A * 4/1964 De Rose ................. E06B 9/115 312/297
4,345,635 A * 8/1982 Solomon ................... E06B 9/15 160/133

(Continued)

FOREIGN PATENT DOCUMENTS

WO 20220266174 A2 12/2022

*Primary Examiner* — Johnnie A. Shablack
(74) *Attorney, Agent, or Firm* — Dority & Manning, P.A.

(57) ABSTRACT

An architectural-structure covering including a covering moveable between extended and retracted positions, a rotatable member coupled to the covering, an operating system coupled to the rotatable member, an operating element manipulatable by a user for rotating the rotatable member, and a track coupled to the operating element to restrain the operating element from being moved away from the track. In some embodiments, the operating element is a bead chain including a plurality of beads and a plurality of dog-bone shaped beads including first and second beads wherein the first bead is positioned within, and forms part of, the bead chain and the second bead is positioned within a channel formed in the track.

12 Claims, 14 Drawing Sheets

(56) References Cited

U.S. PATENT DOCUMENTS

| | | | | |
|---|---|---|---|---|
| 4,932,456 A * | 6/1990 | Buxbaum | E06B 9/324 160/300 |
| 5,676,188 A * | 10/1997 | Cadorette | E06B 9/326 160/320 |
| 6,749,000 B2 * | 6/2004 | Bohlen | E06B 9/322 160/321 |
| 6,789,599 B2 * | 9/2004 | Schutz | E06B 9/70 160/188 |
| 7,975,838 B2 * | 7/2011 | Reist | B65G 35/04 198/833 |
| 9,038,696 B2 * | 5/2015 | Lava | E06B 9/68 160/321 |
| 9,038,800 B2 * | 5/2015 | Dang | E06B 9/322 192/93 A |
| 9,506,290 B2 * | 11/2016 | Lin | E06B 9/78 |
| 9,540,872 B2 * | 1/2017 | Gramsch | E06B 9/368 |
| 9,574,397 B1 * | 2/2017 | Cheng | E06B 9/44 |
| 10,337,243 B2 * | 7/2019 | Berman | F16H 1/28 |
| 10,968,692 B2 * | 4/2021 | Marocco | E06B 9/78 |
| 11,105,149 B2 * | 8/2021 | Marocco | E06B 9/78 |
| 11,118,397 B2 * | 9/2021 | Kirby | E06B 9/78 |
| 11,142,945 B2 * | 10/2021 | Marocco | F16H 7/18 |
| 11,306,534 B2 * | 4/2022 | Goldberg | E06B 9/322 |
| 11,913,280 B2 * | 2/2024 | Lynch | E06B 9/322 |
| 12,065,877 B2 * | 8/2024 | Kirby | E06B 9/42 |
| 2011/0036517 A1 * | 2/2011 | Chen | E06B 9/326 160/319 |
| 2012/0017399 A1 * | 1/2012 | Huang | E06B 9/42 24/115 F |
| 2012/0097343 A1 * | 4/2012 | O'Hair | E06B 9/307 160/368.1 |
| 2018/0238109 A1 * | 8/2018 | Kanargelidis | E06B 9/326 |
| 2018/0363370 A1 * | 12/2018 | Cheng | E06B 9/42 |
| 2019/0169929 A1 * | 6/2019 | Zhang | E06B 9/60 |
| 2019/0195014 A1 * | 6/2019 | Chua | E06B 9/326 |
| 2019/0264501 A1 * | 8/2019 | Marocco | E06B 9/42 |
| 2019/0264503 A1 * | 8/2019 | Marocco | F16H 57/035 |
| 2021/0003475 A1 * | 1/2021 | Kim | G01M 99/001 |
| 2023/0057794 A1 * | 2/2023 | Marocco | E06B 9/78 |
| 2024/0093552 A1 * | 3/2024 | Newcomb | E06B 9/44 |
| 2024/0167333 A1 * | 5/2024 | Nesmith | E06B 9/42 |
| 2024/0271485 A1 * | 8/2024 | Guerra | E06B 9/326 |
| 2025/0116157 A1 * | 4/2025 | Spray | E06B 9/78 |

* cited by examiner

TRACK SYSTEM FOR USE WITH AN OPERATING ELEMENT IN AN ARCHITECTURAL-STRUCTURE COVERING

CROSS-REFERENCE TO RELATED APPLICATIONS

This is a non-provisional of, and claims the benefit of the filing date of, U.S. provisional patent application No. 63/427,160, filed Nov. 22, 2022, entitled "Track System for Use with an Operating Element in an Architectural Structure Covering," the entirety of which application is incorporated by reference herein.

FIELD OF THE DISCLOSURE

The present disclosure relates generally to architectural-structure coverings, and more particularly to a track system for coupling to an endless or looped operating element (e.g., an operating cord, a bead chain, or the like) used to move the covering between extended and retracted positions. The track system enabling the operating element to be exposed while being simultaneously restrained to minimize the extent or amount that the operating element can be pulled away from the track system.

BACKGROUND OF THE DISCLOSURE

Architectural-structure coverings for architectural openings and/or structures (used interchangeably herein without the intent to limit), such as windows, doors, archways, portions of a wall, and the like, have taken numerous forms for many years. Architectural-structure coverings include, for example, roller blinds, vertical blinds, wood blinds, Roman shades, etc. One known architectural-structure covering includes a covering such as a fabric that is movable between an extended position and a retracted position. For example, the covering may be extendable or retractable (e.g., able to be lowered or raised, respectively, in a vertical direction) between an extended position and a retracted position for obscuring and exposing the underlying architectural structure. In use, some architectural-structure coverings include a rotatable member (e.g., a roller) about which the covering may be wrapped during retraction of the covering (e.g., the retracted position), and unwrapped to extend the covering (e.g., the extended position). In use, rotation of the rotatable member in a first direction may retract the covering while rotation of the rotatable member in a second, opposite direction may extend the covering. Alternatively, the covering may be movable in a horizontal direction.

The architectural-structural covering may also include an actuating or operating system operably coupled to the rotatable member and one or more actuating or operating elements, such as, for example, an operating cord, a bead chain, etc., associated with the operating system to move the covering between the retracted position and the extended position. Two ends of the operating element may be coupled together via a connector so that, in use, the operating element may hang from, for example, the operating system in an endless loop so that one run of the depending endless loop can be pulled downwardly while the other run moves upwardly to operate the covering. As such, in use, a user may manipulate the operating element to adjust the position of the covering.

In recent years, various government regulations have been put in place and/or have been proposed to address access to and manipulation of operating elements. For example, regulations are currently proposed that define limits or thresholds related to the user's ability to manipulate or access such operating elements. One option that has been disclosed to address this issue is to provide a device that selectively encases or encloses an accessible portion of the operating element. However, to date, proposed solutions suffer from one or more disadvantages including, for example, making manipulation of the operating element difficult and burdensome on the user.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is an architectural-structure covering. The architectural-structure covering may include a covering movable between an extended position and a retracted position, a rotatable member (e.g., a roller, a shaft, etc.) coupled to the covering, an operating system (e.g., a clutch, a gear, a motor, a drive train, a gear train, combinations thereof, etc.) coupled to the rotatable member for moving the covering between the extended and retracted positions, and an operating element such as, for example, an operating cord, a bead chain, a chain, a belt, or the like, operatively associated with the operating system to move the covering between the extended and retracted positions.

In addition, the architectural-structure covering includes a track system or track (terms used interchangeably herein). In use, the track is arranged and configured to extend, depend from, etc. the architectural-structure covering. In some embodiments, the track is operatively coupled to the architectural-structure covering such as, for example, the headrail, the bracket or mount used to hold the rotatable member and operating system, to the operating system, etc. In use, the track is arranged and configured to be positioned within the interior space of the operating element. That is, the track is arranged and configured to be positioned between the downwardly extending run or segment of the operating element and the upwardly extending run or segment of the operating element.

In use, the operating element is coupled to the track. In some embodiments, the operating element may be intermittently coupled to the track at discrete locations along the length of the track. Alternatively, in alternate embodiments, the operating element may be continuously coupled to the track. In use, the operating element remains accessible to an end user so that the end user can manipulate the operating element to rotate the operating system and thus the rotatable member, which moves the covering between the extended position and the retracted position depending on the direction of rotation. In addition, the coupling of the operating element to the track, restrains the operating element from being pulled away from the track thereby increasing safety considerations associated with using an operating element.

In some embodiments, the operating element may be provided in the form of a bead chain. In use, approximately every twelve or so beads may be formed with a dog-bone shaped bead wherein one bead of the dog-bone shaped bead forms part of the bead chain. A second bead of the dog-bone shaped bead is positioned within a circumferential channel formed in the track. The second bead being coupled to the first bead by a bridge member. As such, the interlocking of the second bead with the channel formed in the track restrains the bead chain from being pulled away from the track. Thus arranged, in use, the end user is prevented from forming a loop larger than the distance between the connected dog-bone shaped beads.

In some embodiments, an architectural-structure covering is disclosed. The architectural-structure covering including a covering moveable between an extended position and a retracted position; a rotatable member coupled to the covering, rotation of the rotatable member in a first direction moving the covering to the extended position and rotation in a second direction opposite the first direction moving the covering to the retracted position; an operating system coupled to the rotatable member; an operating element operatively associated with the operating system, the operating element manipulatable by a user for rotating the rotatable member; and a track coupled to the operating element to restrain the operating element from being moved away from the track.

In some embodiments, the operating element is in the form of an endless loop including a downwardly extending segment and an upwardly extending segment, the downwardly extending segment and the upwardly extending segment defining an interior space, the track being positioned within the interior space.

In some embodiments, the operating element is a bead chain including a plurality of beads.

In some embodiments, the bead chain is coupled to the track at discrete locations along a length of the track.

In some embodiments, the track includes a first surface, a second surface, and an outer perimeter surface extending between the first and second surfaces, the outer perimeter surface including a channel formed therein.

In some embodiments, the bead chain includes a plurality of dog-bone shaped beads including a first bead, a second bead, and a bridge member coupling the first and second beads, the first bead being positioned within, and forming part of, the bead chain, the second bead being arranged and configured to be received within the channel formed in the outer circumferential surface of the track.

In some embodiments, the plurality of dog-bone shaped beads are spaced approximately every eight inches along a length of the bead chain.

In some embodiments, the bead chain includes a plurality of coupling segments, each coupling segment including a first region arranged and configured to receive the bead chain and a second region arranged and configured to be received within the channel formed in the outer circumferential surface of the track.

In some embodiments, the operating element includes a plurality of independent segments interconnected to each other via a linking element, the plurality of independent segments coupled to an outer surface of the track to enable the operating element to move along a length of the track while being restrained from moving away from the track.

In some embodiments, the track includes an enlarged outer circumferential edge, each of the plurality of independent segments including an interior cavity arranged and configured to receive the enlarged outer circumferential edge.

In some embodiments, the operating element includes a plurality of independent coupling segment including a first region arranged and configured to receive the bead chain and a second region arranged and configured to receive an enlarged outer circumferential edge of the track.

In some embodiments, the architectural-structure covering further includes a first operating element coupled to the operating system and a transfer case including a plurality of gears, the first operating element being coupled to a first gear of the plurality of gears in the transfer case, wherein the operating element coupled to the track is a second operating element, the second operating element being manipulatable by a user, the second operating element being coupled to a second gear of the plurality of gears in the transfer case so that manipulation of the second operating element is transferred to the first operating element to rotate the operating system and the rotatable member for moving the covering between the extended and retracted positions.

In an alternate embodiment, an architectural-structure covering is disclosed. The architectural-structure covering including a covering moveable between an extended position and a retracted position; a rotatable member coupled to the covering, rotation of the rotatable member in a first direction moving the covering to the extended position and rotation in a second direction opposite the first direction moving the covering to the retracted position; an operating system coupled to the rotatable member; a bead chain operatively associated with the operating system, the bead chain manipulatable by a user for rotating the operating system and the rotatable member, the bead chain including a plurality of beads and a plurality of dog-bone shaped beads including a first bead, a second bead, and a bridge member coupling the first and second beads, the first bead being positioned within, and forming part of, the bead chain; and a track including a channel formed therein, the channel arranged and configured to receive the second bead of the dog-bone shaped beads to restrain the bead chain from being moved away from the track.

In some embodiments, the bead chain is in the form of an endless loop including a downwardly extending segment and an upwardly extending segment, the downwardly extending segment and the upwardly extending segment defining an interior space, the track being positioned within the interior space.

In some embodiments, the track includes a first surface, a second surface, and an outer perimeter surface extending between the first and second surfaces, the outer perimeter surface including the channel formed therein.

In some embodiments, the plurality of dog-bone shaped beads are spaced approximately every eight inches along a length of the bead chain.

In some embodiments, the architectural-structure covering further includes a first bead chain coupled to the operating system and a transfer case including a plurality of gears, the first bead chain being coupled to a first gear of the plurality of gears in the transfer case, wherein the bead chain coupled to the track is a second bead chain, the second bead chain being manipulatable by a user, the second bead chain being coupled to a second gear of the plurality of gears in the transfer case so that manipulation of the second bead chain is transferred to the first bead chain to rotate the operating system and the rotatable member for moving the covering between the extended and retracted positions.

In an alternate embodiment, an architectural-structure covering is disclosed. The architectural-structure covering including a covering moveable between an extended position and a retracted position; a rotatable member coupled to the covering, rotation of the rotatable member in a first direction moving the covering to the extended position and rotation in a second direction opposite the first direction moving the covering to the retracted position; an operating system coupled to the rotatable member; a first operating element coupled to the operating system; a transfer case including a plurality of gears, the first operating element being coupled to a first gear of the plurality of gears in the transfer case; and a track coupled to a second operating element, the track being arranged and configured to restrain the second operating element from being moved away from the track, the second operating element being manipulatable by a user, the second operating element being coupled to a second gear of the plurality of gears in the transfer case so that manipulation of the second operating element is transferred to the first operating element to rotate the operating system and the rotatable member for moving the covering between the extended and retracted positions.

Figure 1:
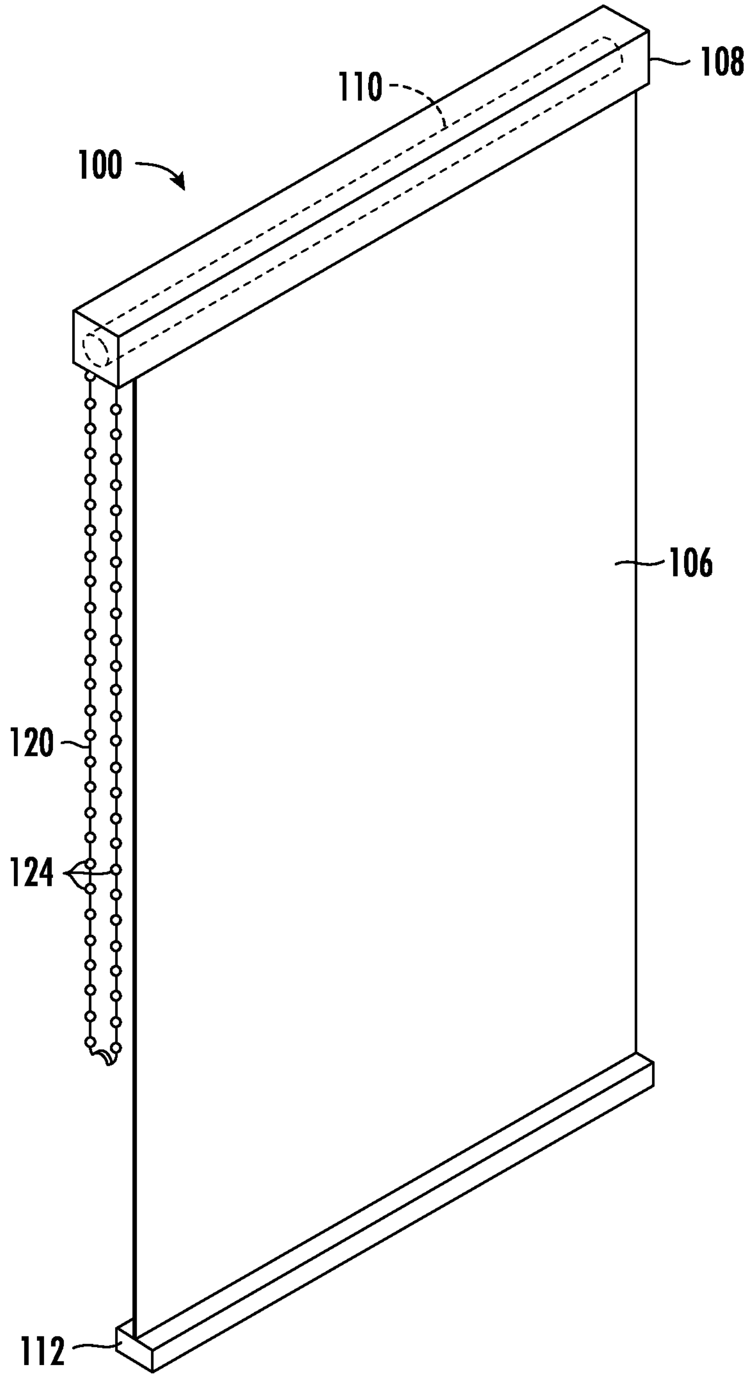
FIG. 1 is a perspective view illustrating an example of an embodiment of an architectural-structure covering including an operating element.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

DETAILED DESCRIPTION

Numerous embodiments of a track system or track (terms used interchangeably herein) arranged and configured to be used in connection with an architectural-structure covering will now be described more fully hereinafter with reference to the accompanying drawings, in which examples or embodiments of the present disclosure are presented. As will be described in greater detail below, in some embodiments, the track is arranged and configured to couple to the operating element to restrain the extent or amount that the operating element can be pulled away from the track. Thus arranged, the track provides increased safety while enabling the operating element to remain exposed for easy access by the end user. The track of the present disclosure may be embodied in many different forms and should not be construed as being limited to the examples or embodiments set forth herein. Rather, these examples or embodiments are provided so that this disclosure will convey certain features of the track to those skilled in the art.

It should be understood that, as described herein, an "example" or an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated examples or embodiments are to be understood as merely examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more examples or embodiments of concepts or features together in a single example or embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one example or embodiment can be used separately, or with another example or embodiment to yield a still further example or embodiment. Thus, it is intended that the present subject matter covers such modifications and variations as come within the scope of the appended claims and their equivalents.

As will be described in greater detail herein, in use, the track is arranged and configured to be coupled to the architectural-structure covering such as, for example, to the headrail, a bracket, or the like. In use, the track may be coupled, either directly or indirectly, to any suitable component of the architectural-structure covering by any suitable mechanism now known or hereafter developed including, for example, via mechanical fasteners, adhesives, or the like. In some embodiments, the track may be coupled to the operating system by a first operating element and transfer case (e.g., a plurality of gears for transferring rotation from one operating element to another operating element).

In use, the track is positioned within the interior space formed by the operating element. That is, in some embodiments, the operating element may be a bead chain. Alternatively, the operating element may be an operating cord, a chain, a belt, or the like. In either event, in use, the track is positioned within the interior space defined by the downwardly extending run or segment of the operating element and the upwardly extending run or segment of the operating element such that the track occupies the interior space formed therebetween. In addition, in use, the track is arranged and configured to be coupled to the operating element. For example, in some embodiments, the track may be coupled to the operating element at discrete locations along the track. Alternatively, the track may be continuously coupled to the operating element. In either event, in use, the operating element remains exposed to the end user for easy manipulation. However, by coupling the operating element to the track, the extent or amount that the operating element can be pulled away from the track is limited, thus minimizing safety concerns associated therewith.

That is, in one example of an embodiment, the operating element is provided in the form of a bead chain, which is restrained by the track. In use, as will be readily appreciated by one of ordinary skill in the art, the bead chain may be coupled to the operating system, which is operatively coupled to the rotatable member (e.g., roller). Manipulation of the bead chain via, for example, the end user grasping the bead chain and pulling down on either of the downwardly extending run or segment of the bead chain or the upwardly extending run or segment of the bead chain causes the rotatable member to rotate, which moves the covering in the retraction or extension direction depending on the direction of movement. In accordance with one or more features of the present disclosure, by coupling the bead chain to the track (which is positioned within the interior space defined by the bead chain) the bead chain is restrained from being pulled away or separated from the track. As a result, the track prevents the user from forming a large loop thereby increasing safety considerations.

As will be shown and described herein, in some embodiments, the operating element may be in the form of a bead chain. However, the operating element may be provided in other forms or configurations. For example, in some embodiments, the operating element may be provided in the form of an operating cord such as, for example, a nylon cord, a belt loop, a chain, etc. As such, the operating element should not be limited to any particular type of cord or chain unless explicitly claimed.

Referring to FIG. 1, an example of an embodiment of an architectural-structure covering 100 that may be used in accordance with the present disclosure is illustrated. The architectural-structure covering 100 may include a covering 106 movable between an extended position and a retracted position, an operating system such as, for example, operating system 242 (FIG. 2A) to move the covering 106 between the extended and retracted positions, and an operating element, which is illustrated in the form of a bead chain 120 operatively associated with the operating system to move the covering 106 between the extended and retracted positions.

As illustrated in FIG. 1, in one example of an embodiment, the covering 106 may be a flexible material having an upper edge coupled to a rotatable member 110 and a lower edge. A bottom rail 112 may be coupled to the lower edge of the covering 106. However, it should be understood that the covering 106 may be any suitable covering now known or hereafter developed including, for example, a stacked or tiered covering such as, for example, a Roman shade, a horizontal cellular shade, a horizontal Venetian shade, or the like.

As illustrated, the architectural-structure covering 100 may also include a headrail 108, which may include a housing having opposed end caps (not shown) to form an open-bottom enclosure. The headrail 108 may also include attachments or brackets (not shown) for coupling the headrail 108 to a structure above, or at the top of, an architectural opening, such as a wall, via mechanical fasteners such as screws, bolts, or the like. In use, the headrail 108 may house the rotatable member 110. Once again, many different types and styles of architectural-structure coverings exist and could be employed in place of the example illustrated in FIG. 1.

Although a particular example of an architectural-structure covering 100 is shown in FIG. 1, many different types and styles of architectural-structure coverings exist and could be employed in place of the embodiments illustrated in FIG. 1. As such, the present disclosure should not be limited to any particular type of architectural-structure covering.

The bead chain 120 is generally operatively associated with an operating system such as, for example, operating system 242 (FIG. 2A) to move the covering 106 between the extended and retracted positions. The operating system can take any appropriate form (e.g., a clutch, a gear, a motor, a drive train, a gear train, combinations thereof, etc.). As illustrated, the bead chain 120 can be in the form of a continuous loop (e.g., a chain, or the like). As will be readily appreciated by one of ordinary skill in the art, the bead chain 120 includes a plurality of interconnected beads 124. In use, the plurality of beads 124 may be rotatably coupled relative to each other.

Referring to FIG. 1, for the sake of convenience and clarity, terms such as "front," "rear," "top," "bottom," "up," "down," "vertical," "horizontal", "inner," and "outer" may be used herein to describe the relative placement and orientation of various components and portions of the architectural-structure covering 100, each with respect to the geometry and orientation of the architectural-structure covering 100 as they appear in FIG. 1. Said terminology is intended to be non-limiting and is used herein merely to describe relationship between various components as illustrated in FIG. 1.

Referring to FIGS. 2A-2E, in one example of an embodiment, the architectural-structure covering 100 further includes a track 200. As illustrated, in use, the track 200 is positioned within the interior space defined by the operating element, which may be provided in the form of a bead chain 220 such that the track 200 occupies the interior space of the bead chain 220. That is, the track 200 is positioned within the interior space defined by the downwardly extending run or segment of the bead chain 220 and the upwardly extending run or segment of the bead chain 220 such that the track 200 occupies the interior space formed therebetween.

Figure 2A:
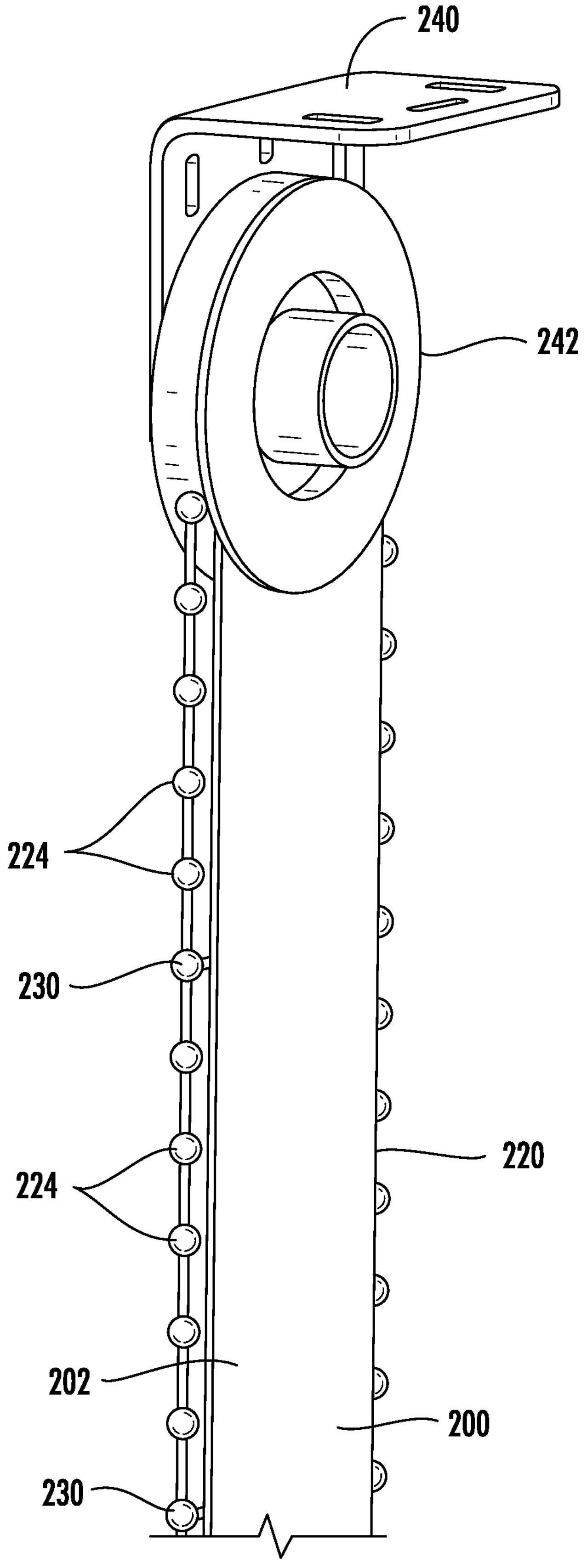
FIG. 2A is a perspective view illustrating an example of an embodiment of a track that may be used in connection with the operating element of the architectural-structure covering shown in FIG. 1.
Figure 2B:
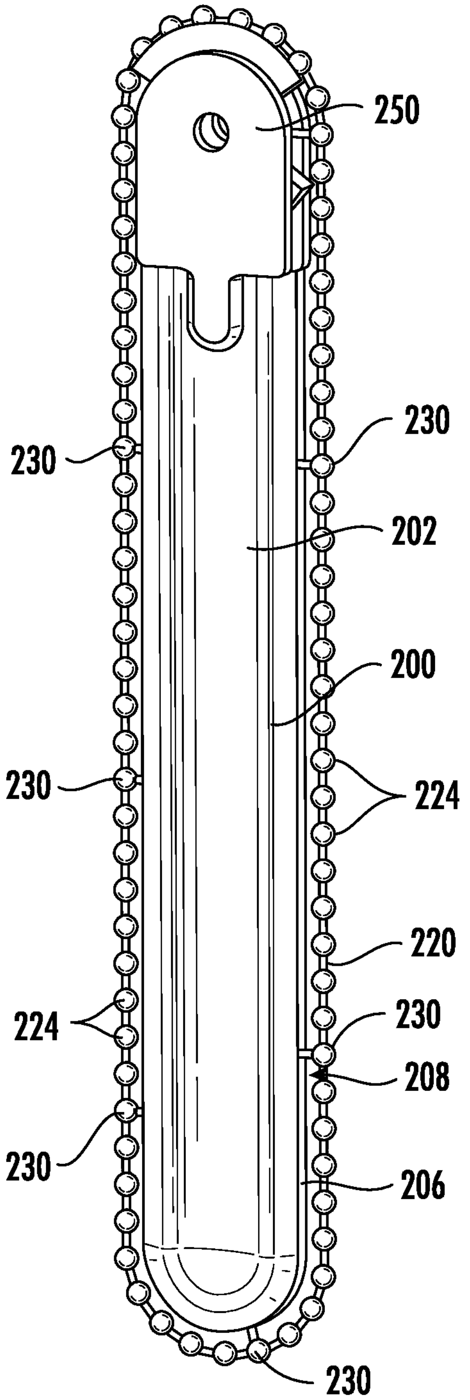
FIG. 2B is a side view illustrating the track and operating element shown in FIG. 2A.
Figure 2C:
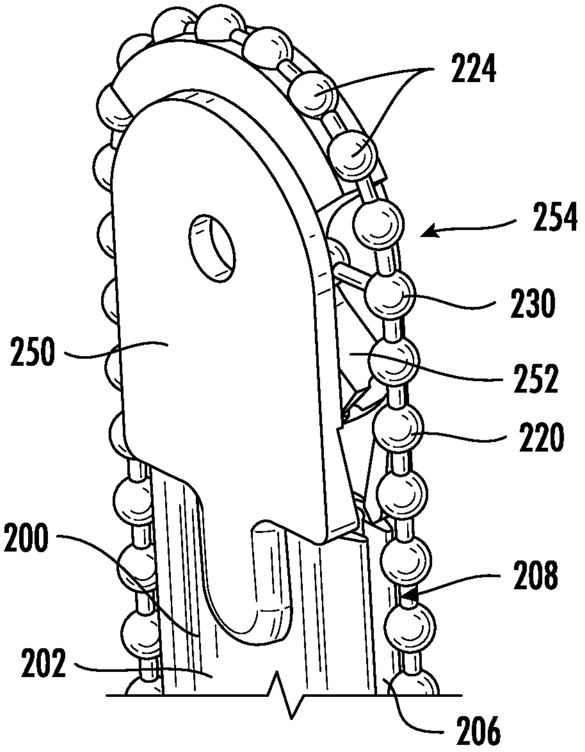
FIG. 2C is a detailed, perspective view illustrating the track and operating element shown in FIG. 2A.
Figure 2D:
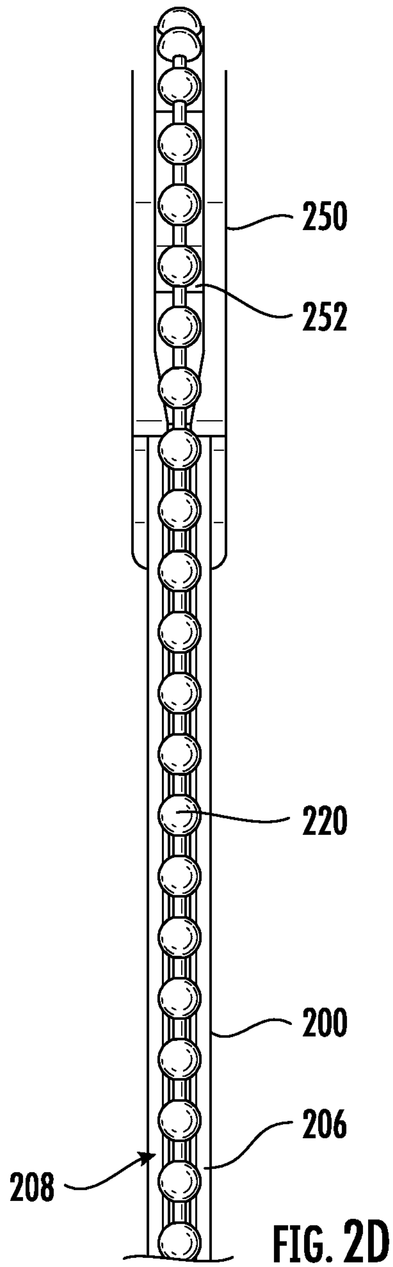
FIG. 2D is a front view illustrating the track and operating element shown in FIG. 2A.
Figure 2E:
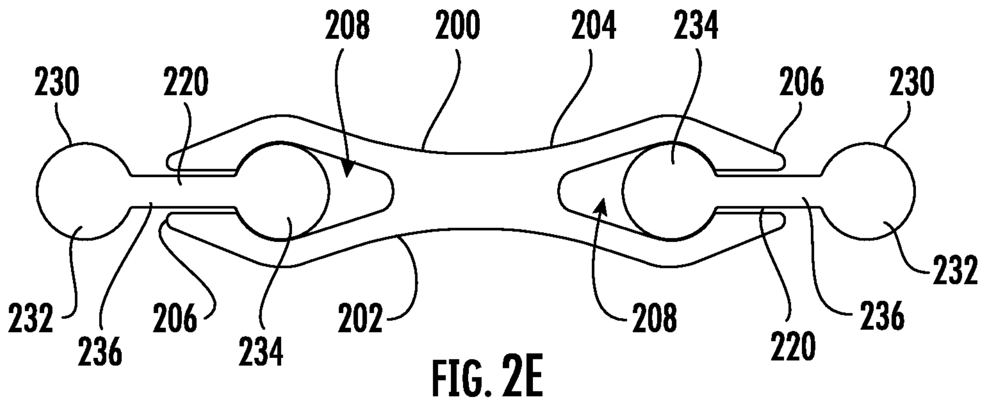
FIG. 2E is a cross-sectional view illustrating the track and operating element shown in FIG. 2A.

The track 200 may be operatively associated or coupled, either directly or indirectly, to the architectural-structure covering 100 by any suitable mechanism now known or hereafter developed. For example, in some embodiments, the track 200 may be coupled to the headrail. Alternatively, in some embodiments, the track 200 may be coupled to the bracket or mount 240 associated with the operating system 242 (as illustrated in FIG. 2A). In other embodiments, the track 200 may be held in position relative to the operating system 242 via the operating element (e.g., bead chain 220). In addition, and/or alternatively, the track 200 may be coupled via any suitable fastening mechanism now known or hereafter developed including, for example, mechanical fasteners (e.g., screws), adhesives, etc. In some embodiments, the track 200 may be coupled to the operating system via a first operating element as will be described in greater detail below. That is, as will be described in greater detail below, in some embodiments, the track 200 may be coupled to the operating system via an intermediate operating element such as, a bead chain or operating cord, coupled to a transfer case (e.g., a plurality of gears for transferring rotation from one operating element to the other operating element). Once again, the track 200 may be held in position relative to the operating system and/or operating element via any suitable mechanism now known or hereafter developed.

As illustrated, in some embodiments, the track 200 includes a first surface 202, a second surface 204, and an outer circumference or perimeter surface 206 extending between the first and second surfaces 202, 204. The outer circumference or perimeter surface 206 including a channel 208 formed therein.

In addition, as illustrated, the bead chain 220 includes a plurality of dog-bone shaped beads 230. As such, in accordance with one or more features of the present disclosure, the bead chain 220 may include a plurality of conventional interconnected beads 224 and a plurality of dog-bone shaped beads 230. In use, each dog-bone shaped bead 230 (see, e.g., FIG. 2E) includes a first bead 232, a second bead 234, and an interconnecting bridge member 236 connecting the first and second beads 232, 234. In use, the first bead 232 is positioned within the bead chain 220 and thus forms part of the bead chain 220. The second bead 234 is arranged and positioned to sit and ride within the channel 208 formed in the outer circumference or perimeter surface 206 of the track 200. Thus arranged, the bead chain 220 is coupled to the track 200 by the dog-bone shaped beads 230 and thus is restrained from pulling away from the track 200. In some embodiments, the dog-bone shaped beads 230 may be positioned every twelve beads, although this is but one configuration and a different spacing may be used. In one preferred embodiment, the positioning of the dog-bone shaped beads 230 is arranged and configured to not exceed eight (8) inches (e.g., a dog-bone shaped bead 230 may be positioned every eight (8) inches along a length of the bead chain 220).

In accordance with one or more features, by coupling the operating element (e.g., bead chain 220) to the track 200 using intermittently spaced dog-bone shaped beads 230, the bead chain 220 can be restrained to limit the amount or distance that the bead chain 220 can be moved or pulled away from the track 200 and thereby increase the safety of the bead chain 220. In addition, such an arrangement enables the bead chain 220 to remain easily accessed by the end user to facilitate easy manipulation of the bead chain 220 by the end user.

As illustrated, the track 200 may include an end cap 250. The end cap 250 may include one or more pulleys or wheels 252. In use, the pulley or wheel 252 includes one or more recesses 254 for receiving the second bead 234 of the dog-bone shaped beads 230 and for guiding the second bead 234 into and out of engagement with the channel 208 formed in the outer circumference or perimeter surface 206 of the track 200. Thus arranged, in use, movement of the bead chain 220 by a user grasping and pulling on the bead chain 220 moves the bead chain 220 relative to the track 200.

In some embodiments, the pulley or wheel 252 may be used to transfer rotation from the bead chain 220, either directly or indirectly, to the operating system 242. For example, the pulley or wheel 252 may be coupled to the operating system. Alternatively, in some embodiments, the pulley or wheel 252 may be coupled to a second pulley or wheel. In use, movement of the bead chain 220 rotates the pulley or wheel 252, which rotates the second pulley or wheel, which rotates a second operating element such as, for example, a second bead chain coupled to the second pulley or wheel and the operating system.

In accordance with one or more features of the present disclosure, the operating element and/or track may be provided in alternate configurations so long as the operating element is coupled to the track to restrain the amount or distance that the operating element can be pulled from the track.

Figure 3A:
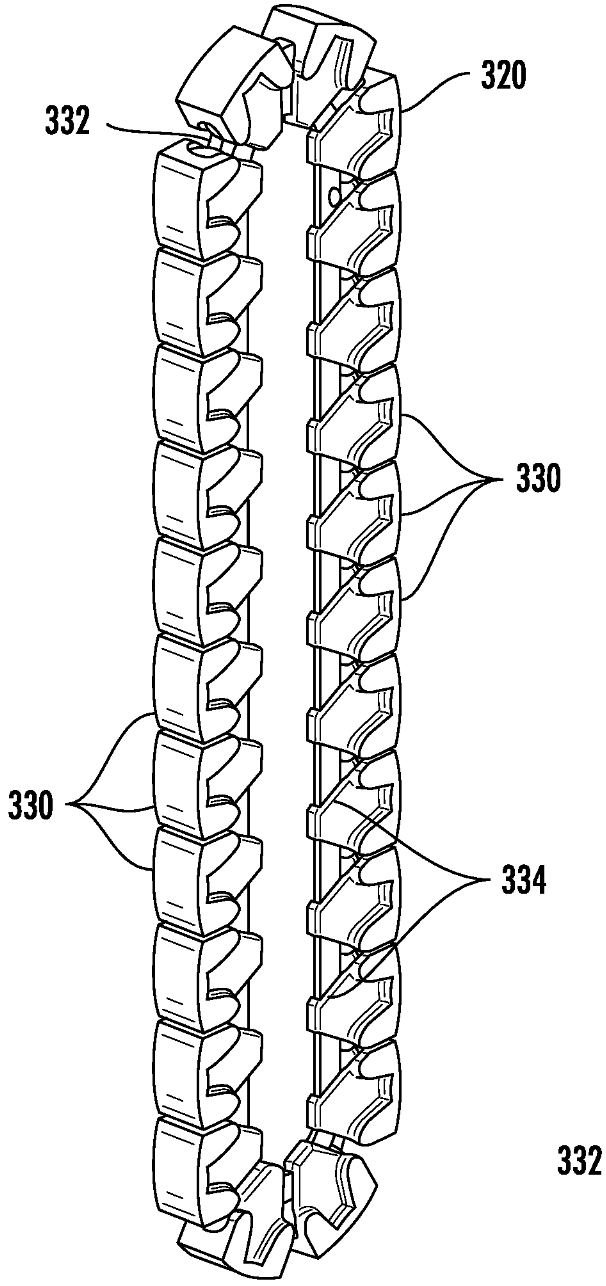
FIG. 3A is a perspective view illustrating an alternate example of an embodiment of a track that may be used in connection with the operating element of the architectural-structure covering shown in FIG. 1.
Figure 3B:
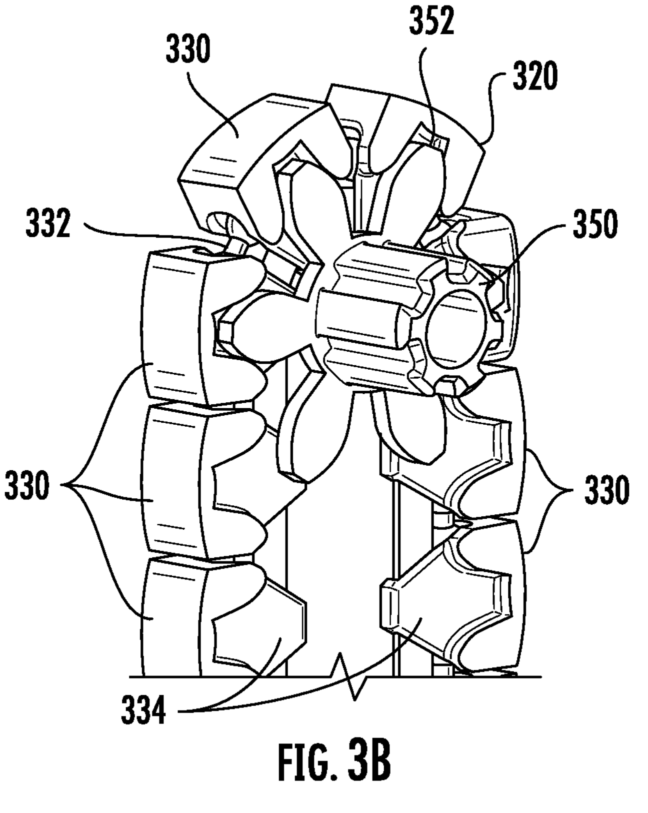
FIG. 3B is detailed, perspective view illustrating the track and operating element shown in FIG. 3A.
Figure 3C:
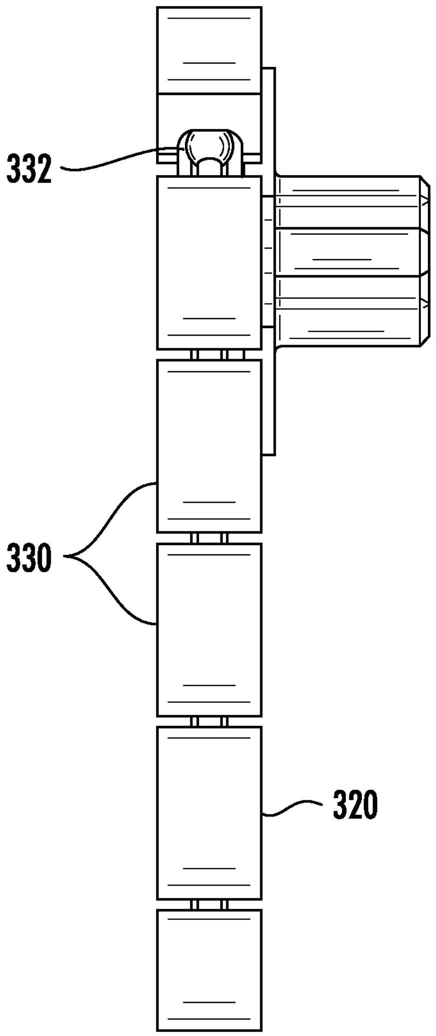
FIG. 3C is a front view illustrating the track and operating element shown in FIG. 3A.
Figure 3D:
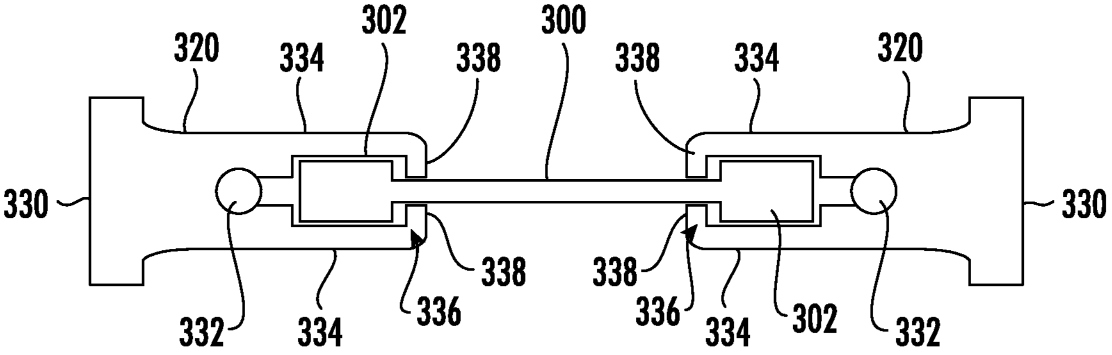
FIG. 3D is a cross-sectional view illustrating the track and operating element shown in FIG. 3A.
Figure 3E:
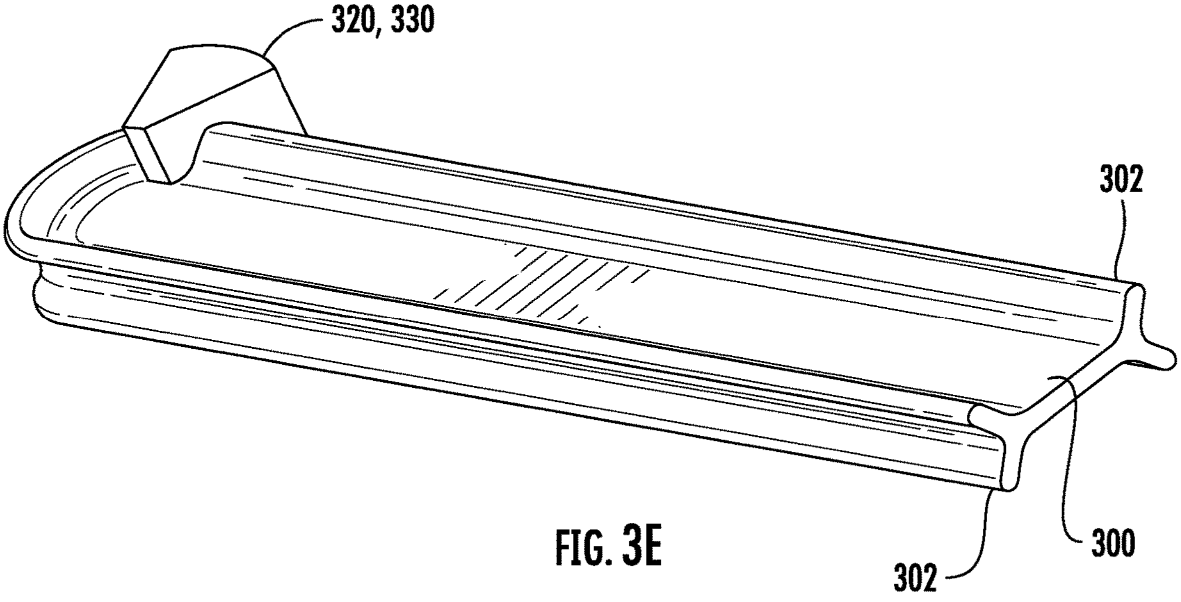
FIG. 3E is a perspective view illustrating an alternate example of an embodiment of a track that may be used in connection with the operating element of the architectural-structure covering shown in FIG. 1.

For example, with reference to FIGS. 3A-3E, the operating element 320 can include a plurality of independent segments 330 connected to adjacent segments 330 via a linking element 332 (e.g., operating element 320 includes a plurality of segments 330 stacked next to each other connected along a cord or individual linking elements 332). The track 300 can include an enlarged circumferential edge 302 such that the track 300 is provided with, for example, a T-shaped edge (as generally illustrated in FIGS. 3A-3D) or a Y-shaped edge (as generally illustrated in FIG. 3E). In use, the plurality of segments 330 of the operating element 320 are arranged and configured with correspondingly shaped recesses to engage the track 300 so that the operating element 320 may move along an outer surface of the track 300 while being prevented from moving laterally or transversely away from the track 300.

In use, the operating element 320 may be coupled to the track 300 via any suitable mechanism now known or hereafter developed. For example, as best illustrated in FIG. 3D, in some embodiments, each segment 330 of the operating element 320 may include first and second arms 334 defining an interior cavity 336 therebetween, the interior cavity 336 being sized and configured to receive the enlarged outer surface of the track 300. In addition, each arm 334 may include an inwardly extending projection 338 for coupling to and securing the segments 330 to the track 300.

As illustrated, the track 300 may be operatively coupled to a pulley or wheel 350. In use, the pulley or wheel 350 includes a plurality of radially extending arms or geared teeth 352. In use, the arms or geared teeth 352 may be received within corresponding recesses formed in the segments 330 forming the operating element 320. Thus arranged, in use, movement of the operating element 320 by a user grasping and pulling on the operating element 320 moves the operating element (e.g., segments 330) relative to the track 300. The pulley or wheel 350 transferring the rotation to the operating system, either directly or indirectly.

Figure 4A:
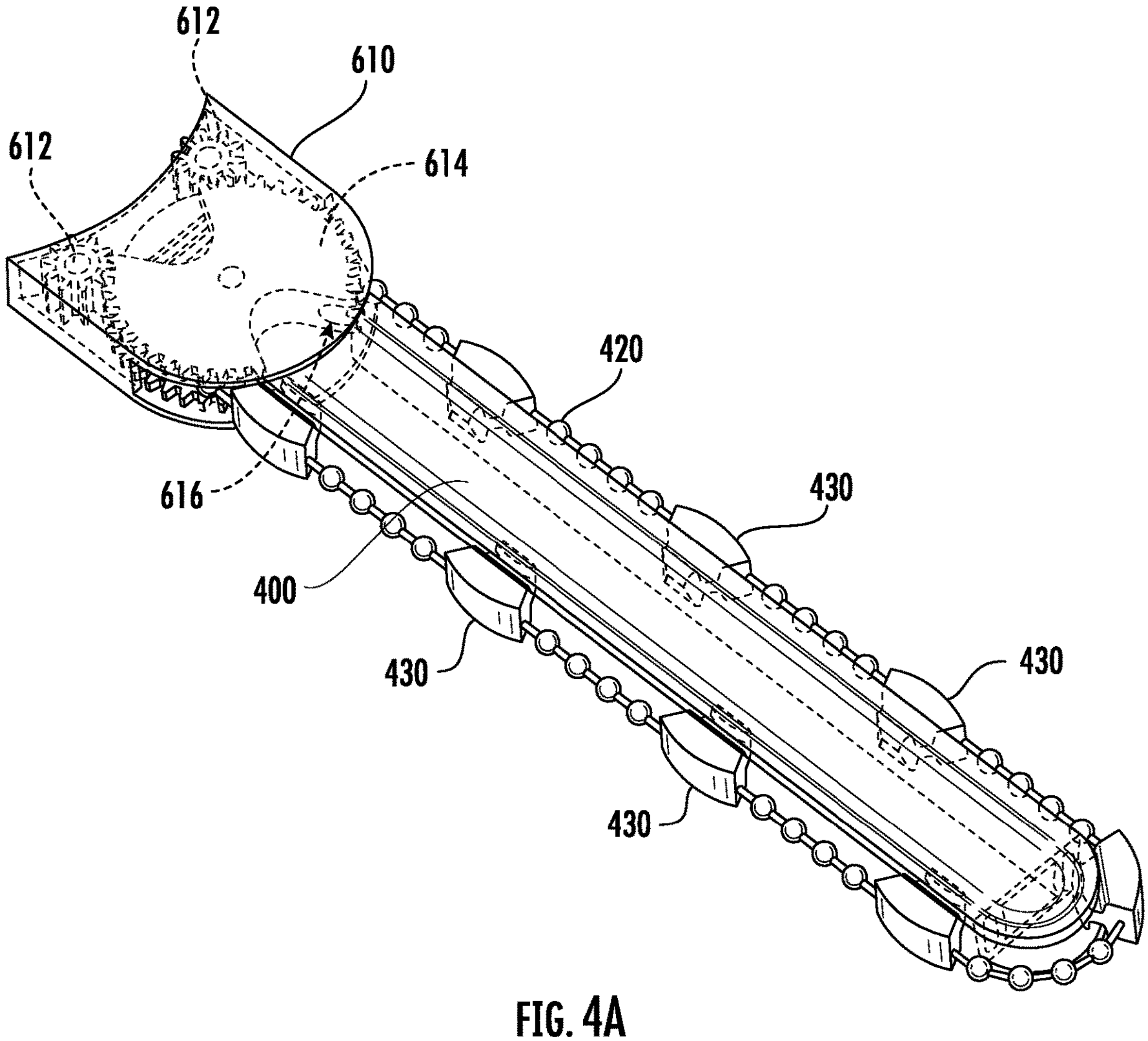
FIG. 4A is a perspective view illustrating an alternate example of an embodiment of a track that may be used in connection with the operating element of the architectural-structure covering shown in FIG. 1.
Figure 4B:
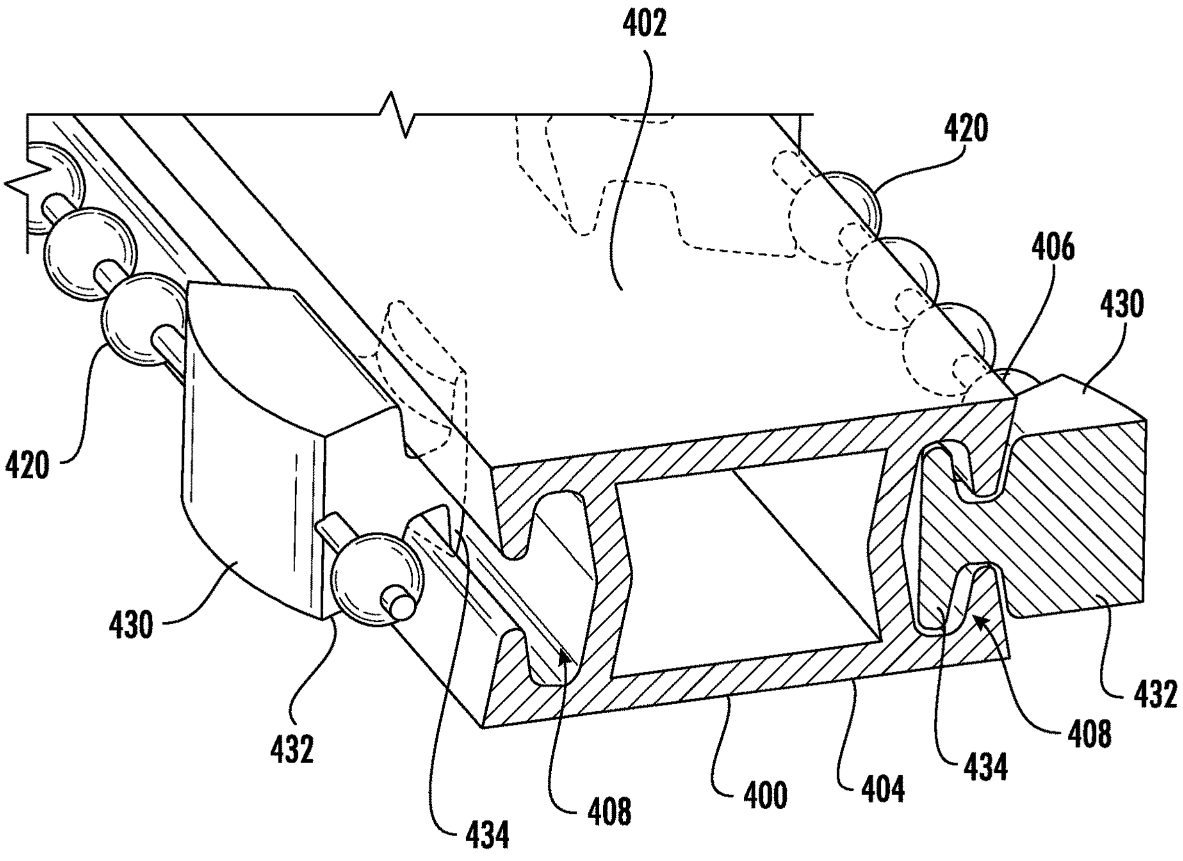
FIG. 4B is detailed, cross-sectional view illustrating the track and operating element shown in FIG. 4A.

Alternatively, the operating element may be coupled to the track via alternate coupling mechanisms. For example, with reference to FIGS. 4A and 4B, in an alternate embodiment similar to the embodiment described above in connection with FIGS. 2A-2E, the operating element may be in the form of a bead chain 420. The operating element (e.g., bead chain 420) may include a plurality of coupling segments 430 intermittently spaced along the length of the bead chain 420. The coupling segments 430 can each include first and second regions 432, 434 arranged and configured to couple the bead chain 420 to the track 400 while allowing the bead chain 420 to move along the length of the track 400. In use, the first region 432 may be arranged and configured to receive the bead chain 420. For example, the first region 432 may include a channel arranged and configured to receive the bead chain 420, although this is but one configuration and alternate configurations are envisioned, for example, the first region 432 may include a bore for enabling the bead chain 420 to pass therethrough or the first region may be integrally formed with the bead chain. The second region 434 is arranged and configured to be received within a channel 408 formed in a perimeter surface 406 extending between the first and second surfaces 402, 404 of the track 400. For example, the second region 434 may include a T-shaped member arranged and configured to be received within a T-shaped channel 408, although this is but one configuration, and others are contemplated.

In addition, as illustrated, and as will be described in greater detail below, the track 400 may include, or be operatively associated with, a transfer case 610. In use, the transfer case 610 includes a plurality of pulleys, wheels, gears, or the like 612, 614. The gear 614 that engages the bead chain 420 can include at least one recess 616 configured to receive the operating element (e.g., bead chain 420) as the operating element (e.g., bead chain 420) moves about the gear 614. In use, the gear 614 is arranged and configured to receive the operating element (e.g., bead chain 420). In addition, the transfer case 610 may be operatively associated with gears 612, which may be operatively associated with the operating system via, for example, a short bead chain. In use, movement of the operating element (e.g., bead chain 420) by the end user is transferred by the transfer case 610 and the plurality of gears 612, 614 positioned therein to the operating system.

Once again, as previously described, the coupling segments 430 are arranged and configured to couple the operating element (e.g., bead chain, operating cord, etc.) to the track at discrete positions along the length of the operating element (e.g., bead chain, operating cord, etc.) so that the operating element may move relative to the track while being simultaneously restrained from being pulled away from the track.

Figure 5:
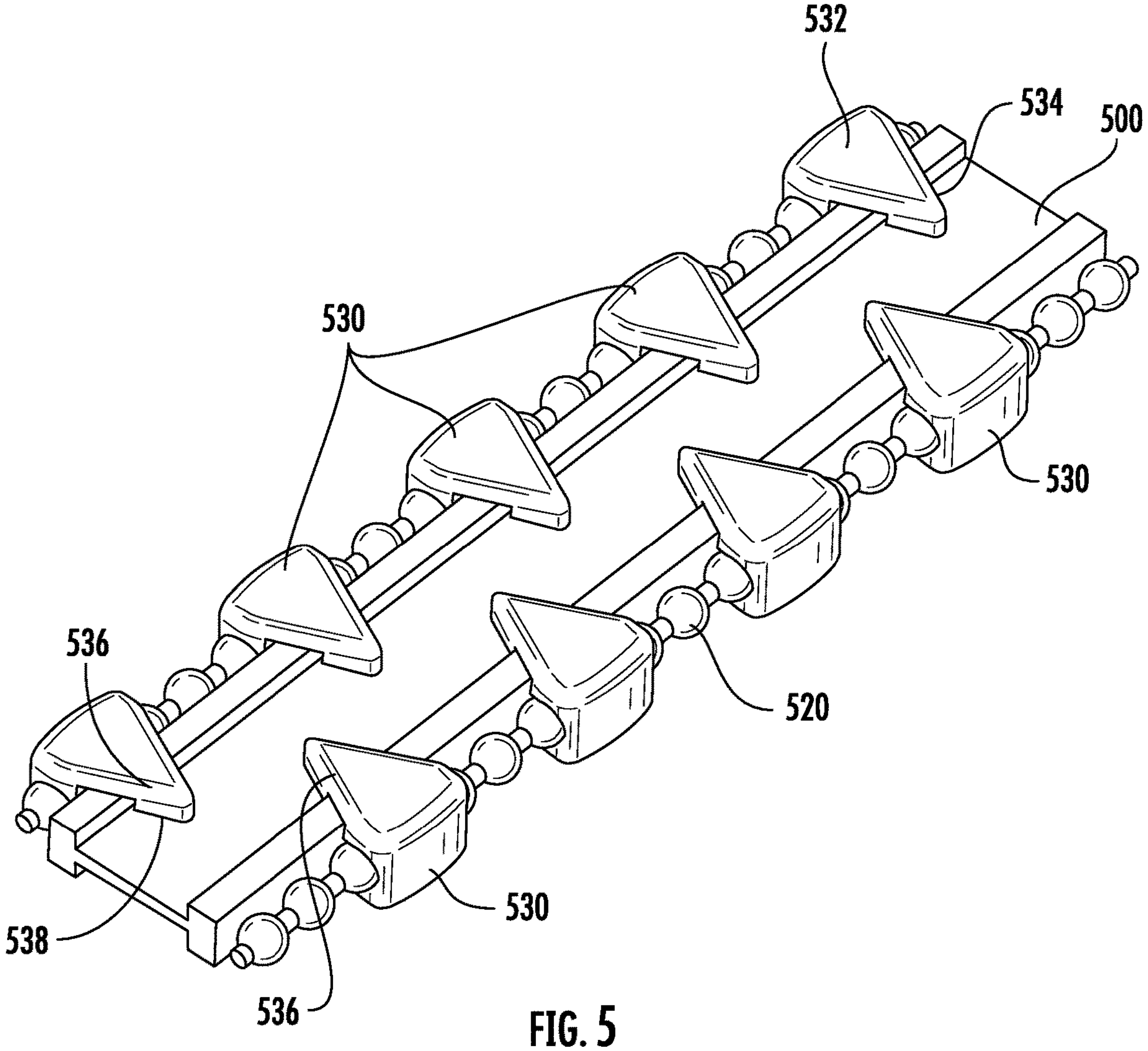
FIG. 5 is a perspective view illustrating an alternate example of an embodiment of a track that may be used in connection with the operating element of the architectural-structure covering shown in FIG. 1.

In yet another example of an embodiment similar to the embodiment described above in connection with FIGS. 3A-3E, with reference to FIG. 5, the operating element may be provided in the form of a bead chain 520. In addition, the operating element (e.g., bead chain 520) may include a plurality of coupling segments 530 including first and second regions 532, 534 arranged and configured to couple the operating element (e.g., bead chain 520) to the track 500. In use, the first region 532 may be arranged and configured to receive the bead chain 520. For example, the first region 532 may include a channel arranged and configured to receive the bead chain 520, although this is but one configuration and alternate configurations are envisioned, for example, the first region 532 may include a bore for enabling the bead chain 520 to pass therethrough or the first region may be integrally formed with the bead chain. The second region 534 may be arranged and configured with first and second opposing arms 536 defining an interior cavity therebetween, where the interior cavity is sized and configured to receive an enlarged outer surface of the track 500 as previously described. In addition, each arm 536 may include an inwardly extending projection 538 for coupling to and securing the segments 530 to the track 500.

Once again, as previously described, the coupling segments 530 are arranged and configured to couple the operating element (e.g., bead chain, operating cord, etc.) to the track at discrete positions along the length of the operating element (e.g., bead chain, operating cord, etc.) so that the operating element may move along an outer surface of the track while being simultaneously restrained from being pulled away from the track.

Figure 6A:
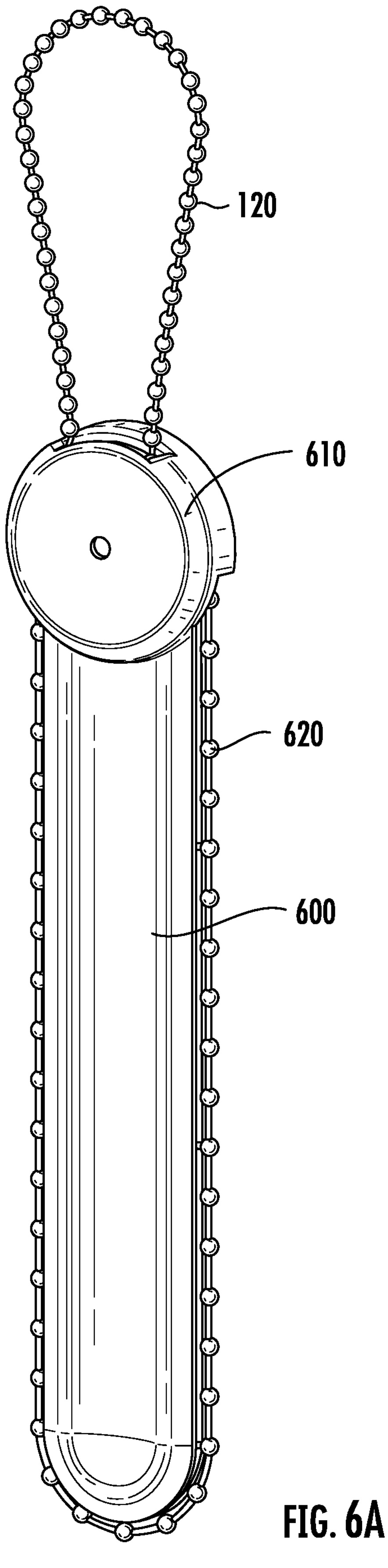
FIG. 6A is a perspective view illustrating an alternate example of an embodiment of a track that may be used in connection with the operating element of the architectural-structure covering shown in FIG. 1.
Figure 6B:
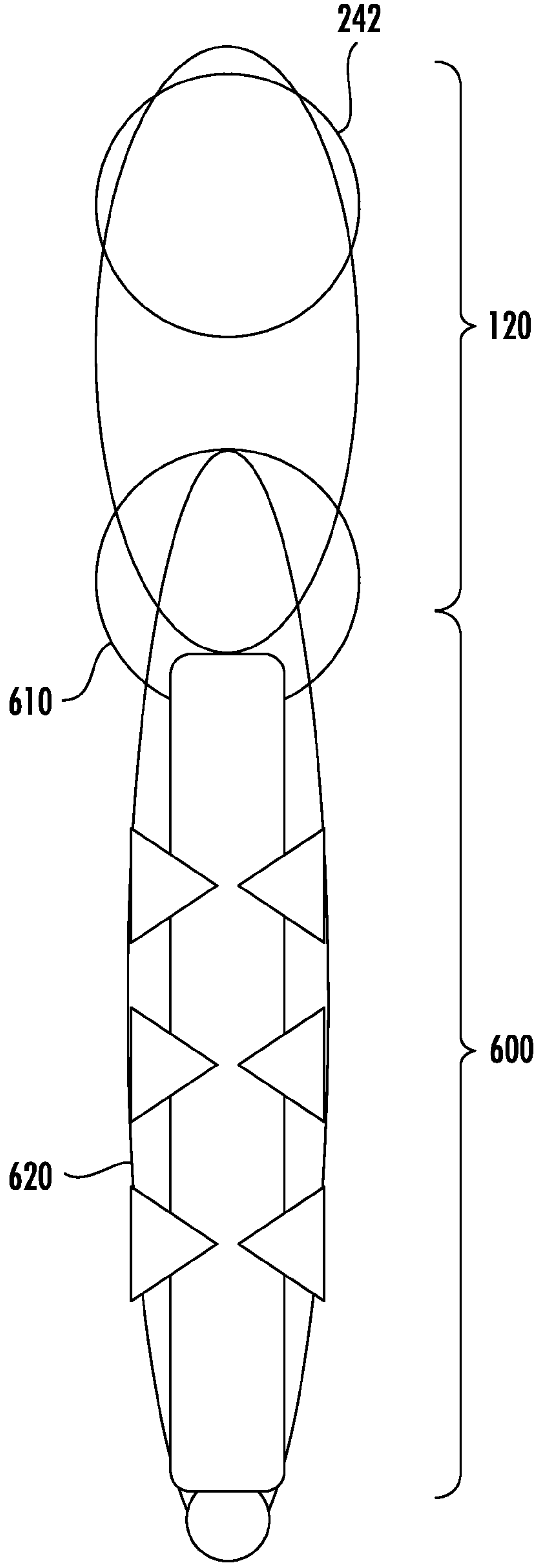
FIG. 6B is a schematic layout of the track and operating element shown in FIG. 6A.

As previously mentioned, the track may be coupled to an architectural-structure covering by any suitable mechanism now known or hereafter developed. For example, the track may be coupled, directly or indirectly, to a bracket associated with the headrail (FIG. 2A). Alternatively, however, it is envisioned that the track may be provided as a standalone component. That is, with reference to FIGS. 6A and 6B, the track 600 may include a transfer case 610. In use, the transfer case 610 is arranged and configured to receive a first operating element such as, for example, a shorter bead chain 120, extending from the operating system of the architectural-structure covering. In additional, the transfer case 610 is arranged and configured to receive a second operating element such as, for example, bead chain 620, associated with the track 600. The bead chain 620 may be coupled to the track 600 by any suitable mechanism now known or hereafter developed including those described herein.

In use, the transfer case 610 is arranged and configured to transfer movement of the second operating element (e.g., bead chain 620) to the first operating element (e.g., the shorter bead chain 120). By providing the track 600 with a transfer case 610, the track 600 can be manufactured as a single standardized assembly or system that may be quickly and easily coupled to any architectural-structure covering including an operating element (e.g., bead chain). That is, in use, a shorter length operating element (e.g., bead chain 120) may be associated with an existing operating system of an existing architectural-structure covering. No changes to the hardware of the existing architectural-structure covering is required. The operating element (e.g., bead chain 120) associated with the operating system can be coupled to the transfer case 610. In use, the transfer case 610 may be coupled to the top of the track 600 so that the track 600 and bead chain 620 form a wand type assembly. The wand type assembly could be coupled to the architectural-structure covering via the shorter length operating element (e.g., bead chain 120) associated with the operating system of the architectural-structure covering.

Figure 7:
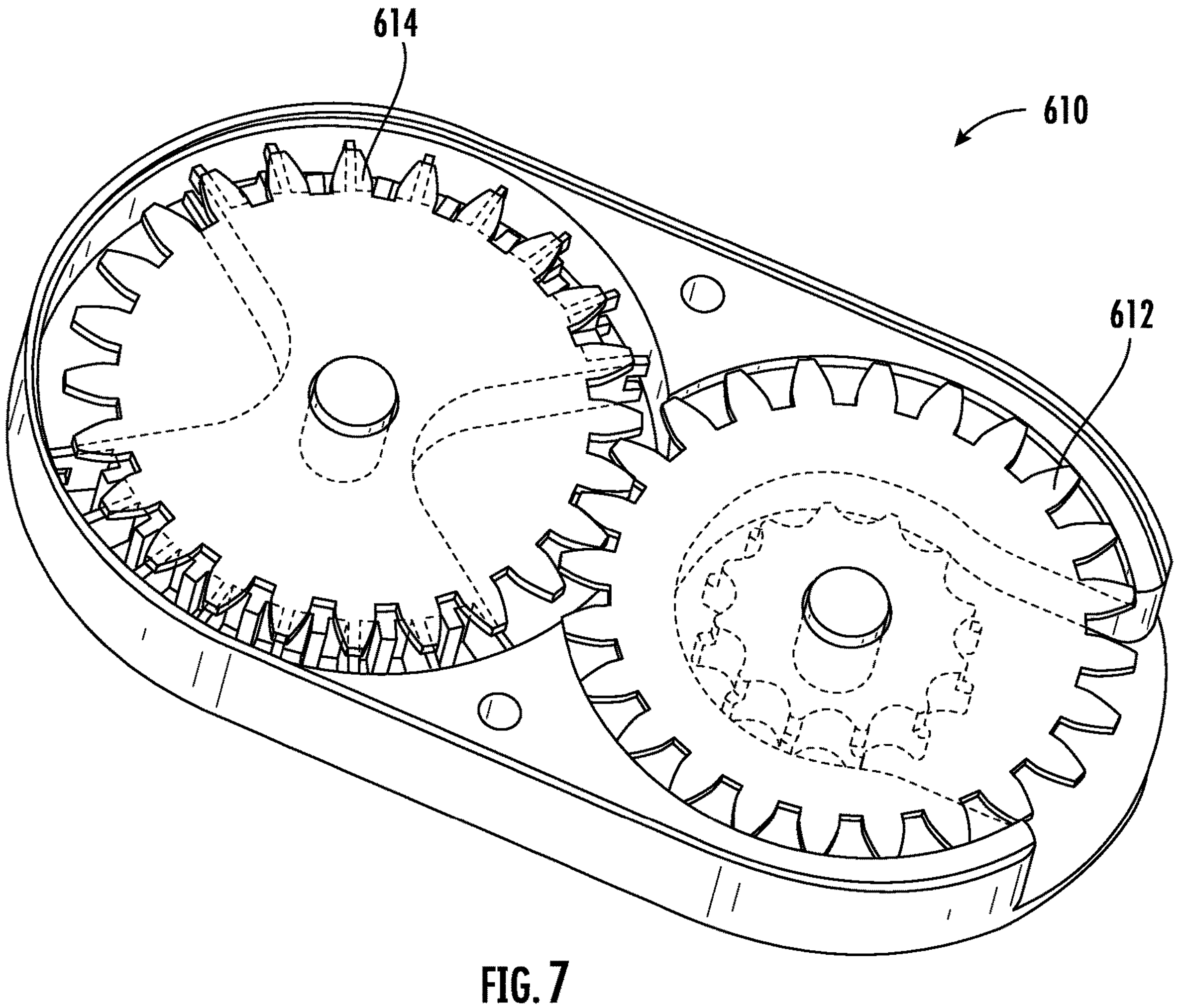
FIG. 7 is a perspective view illustrating an example of an embodiment of a transfer case that may be used in connection with the track and operating element of FIGS. 6A and 6B.
Figure 8:
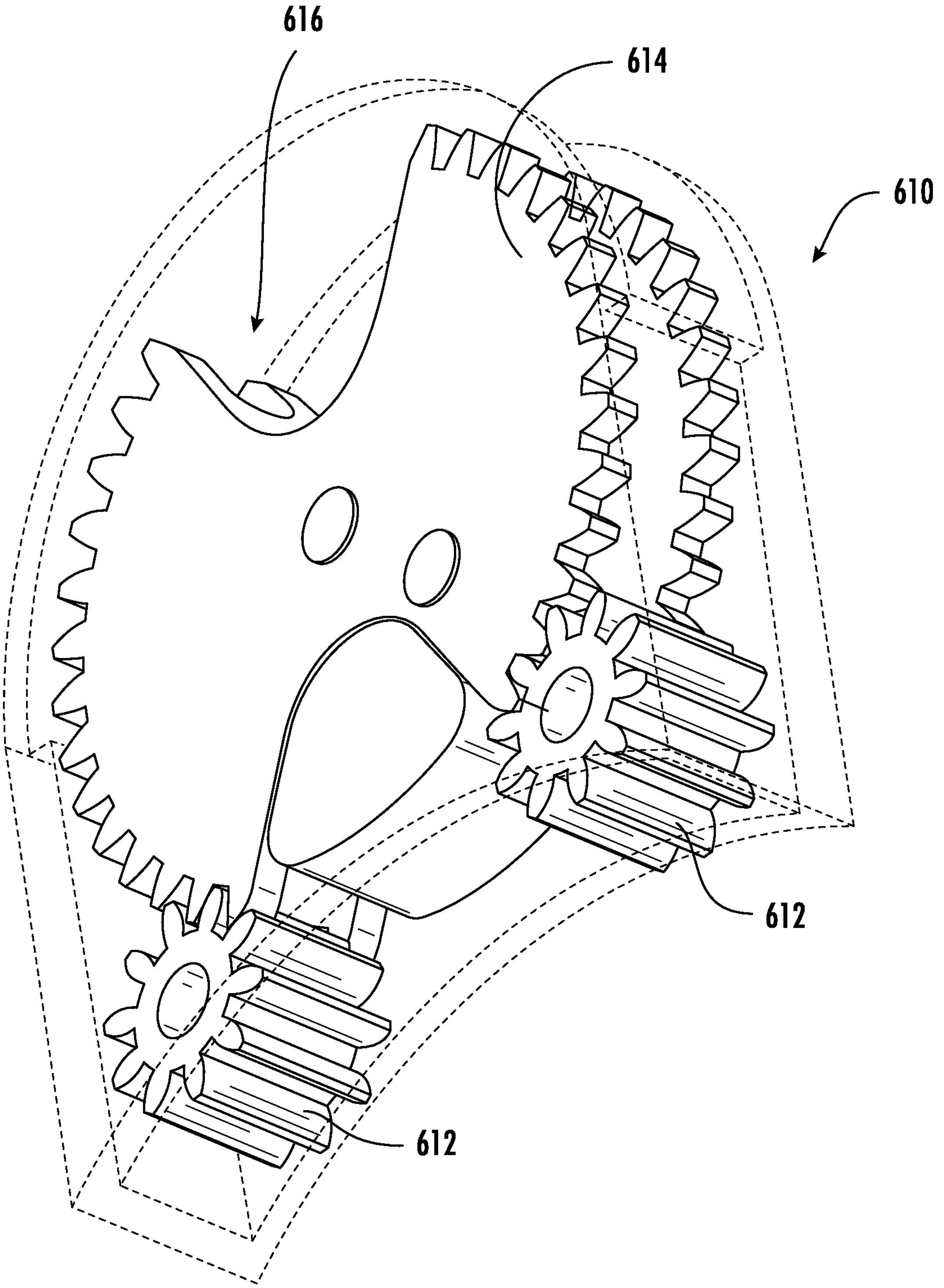
FIG. 8 is a perspective view illustrating an alternate example of an embodiment of a transfer case that may be used in connection with the track and operating element of FIGS. 6A and 6B.

In use, the transfer case 610 may have any suitable configuration now know or hereafter developed. For example, as illustrated in FIG. 7, the transfer case 610 may include first and second gears or pulleys 612, 614 arranged in a stacked relationship. The first gear or pulley 612 arranged and configured to receive or interact with the first operating element associated with the operating system. The second gear or pulley 614 may be arranged and configured to receive or interact with the second operating element associated with the track 600. Alternatively, with reference to FIG. 8, the transfer case 610 may include a plurality of pulleys including first, second, and third pulleys 612, 614 arranged and configured in a side-by-side relationship, which decreases the overall height of the transfer case.

The track may be manufactured from any suitable material now known or hereafter developed including, for example, a metal such as, for example, aluminum, a plastic, or the like.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The foregoing description has broad application. It should be appreciated that the concepts disclosed herein may apply to many types of coverings, in addition to the roller-type coverings described and depicted herein. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one," "one or more," and "and/or" as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

What is claimed:

1. An architectural-structure covering comprising:

a covering moveable between an extended position and a retracted position;

a rotatable member coupled to the covering, rotation of the rotatable member in a first direction moving the covering to the extended position and rotation in a second direction opposite the first direction moving the covering to the retracted position;

an operating system coupled to the rotatable member;

an operating element operatively associated with the operating system, the operating element manipulatable by a user for rotating the rotatable member; and a track coupled to the operating element to restrain the operating element from being moved away from the track, wherein the operating element is in the form of an endless loop including a downwardly extending segment and an upwardly extending segment, the downwardly extending segment and the upwardly extending segment defining an interior space, the track being positioned within the interior space, wherein the operating element is a bead chain including a plurality of beads, the bead chain being coupled to the track at discrete locations along a length of the track, and wherein the operating element includes a plurality of independent coupling segments including a first region arranged and configured to receive the bead chain and a second region arranged and configured to receive an enlarged outer circumferential edge of the track.

2. The architectural-structure covering of claim 1, further comprising a first operating element coupled to the operating system; and a transfer case including a plurality of gears, the first operating element being coupled to a first gear of the plurality of gears in the transfer case;

wherein the operating element coupled to the track is a second operating element, the second operating element being manipulatable by a user, the second operating element being coupled to a second gear of the plurality of gears in the transfer case so that manipulation of the second operating element is transferred to the first operating element to rotate the operating system and the rotatable member for moving the covering between the extended and retracted positions.

3. An architectural-structure covering comprising:

a covering moveable between an extended position and a retracted position;

a rotatable member coupled to the covering, rotation of the rotatable member in a first direction moving the covering to the extended position and rotation in a second direction opposite the first direction moving the covering to the retracted position;

an operating system coupled to the rotatable member;

a bead chain operatively associated with the operating system, the bead chain manipulatable by a user for rotating the operating system and the rotatable member, the bead chain including a plurality of beads;

a plurality of dog-bone shaped beads including a first bead, a second bead, and a bridge member coupling the first and second beads, the first bead of the dog-bone shaped beads being positioned within, and forming part of, the bead chain; and a track including a channel formed therein, the channel arranged and configured to receive the second bead of the dog-bone shaped beads to restrain the bead chain from being moved away from the track, wherein the first bead of the dog-bone shaped beads remains outside the channel while the second bead of the dog-bone shaped beads is received within the channel as the dog-bone shaped beads are moved along the track with manipulation of the bead chain.

4. The architectural-structure covering of claim 3, further comprising a first bead chain coupled to the operating system; and a transfer case including a plurality of gears, the first bead chain being coupled to a first gear of the plurality of gears in the transfer case;

wherein the bead chain coupled to the track is a second bead chain, the second bead chain being manipulatable by a user, the second bead chain being coupled to a second gear of the plurality of gears in the transfer case so that manipulation of the second bead chain is transferred to the first bead chain to rotate the operating system and the rotatable member for moving the covering between the extended and retracted positions.

5. The architectural-structure covering of claim 3, wherein the bead chain remains outside the channel while the second bead of the dog-bone shaped beads is received within the channel.

6. The architectural-structure covering of claim 3, wherein the bead chain is in the form of an endless loop including a downwardly extending segment and an upwardly extending segment, the downwardly extending segment and the upwardly extending segment defining an interior space, the track being positioned within the interior space.

7. The architectural-structure covering of claim 6, wherein the track includes a first surface, a second surface, and an outer perimeter surface extending between the first and second surfaces, the outer perimeter surface including the channel formed therein.

8. The architectural-structure covering of claim 7, wherein the plurality of dog-bone shaped beads are spaced approximately every eight inches along a length of the bead chain.

9. An architectural-structure covering comprising:

a covering moveable between an extended position and a retracted position;

a rotatable member coupled to the covering, rotation of the rotatable member in a first direction moving the covering to the extended position and rotation in a second direction opposite the first direction moving the covering to the retracted position;

an operating system coupled to the rotatable member;

an operating element operatively associated with the operating system, the operating element manipulatable by a user for rotating the rotatable member; and a track coupled to the operating element to restrain the operating element from being moved away from the track, the track including a first surface, a second surface, and an outer perimeter surface extending between the first and second surfaces, the outer perimeter surface including a channel formed therein, wherein the operating element is in the form of an endless loop including a downwardly extending segment and an upwardly extending segment, the downwardly extending segment and the upwardly extending segment defining an interior space, the track being positioned within the interior space, wherein the operating element is a bead chain including a plurality of beads, the bead chain being coupled to the track at discrete locations along a length of the track, wherein the bead chain includes a plurality of coupling segments, each coupling segment including a first region arranged and configured to receive the bead chain and a second region arranged and configured to be received within the channel formed in the track.

10. The architectural-structure covering of claim 9, further comprising a first operating element coupled to the operating system; and a transfer case including a plurality of gears, the first operating element being coupled to a first gear of the plurality of gears in the transfer case;

wherein the operating element coupled to the track is a second operating element, the second operating element being manipulatable by a user, the second operating element being coupled to a second gear of the plurality of gears in the transfer case so that manipulation of the second operating element is transferred to the first operating element to rotate the operating system and the rotatable member for moving the covering between the extended and retracted positions.

11. An architectural-structure covering comprising:

a covering moveable between an extended position and a retracted position;

a rotatable member coupled to the covering, rotation of the rotatable member in a first direction moving the covering to the extended position and rotation in a second direction opposite the first direction moving the covering to the retracted position;

an operating system coupled to the rotatable member;

an operating element operatively associated with the operating system, the operating element manipulatable by a user for rotating the rotatable member; and a track coupled to the operating element to restrain the operating element from being moved away from the track, wherein the operating element is in the form of an endless loop including a downwardly extending segment and an upwardly extending segment, the downwardly extending segment and the upwardly extending segment defining an interior space, the track being positioned within the interior space, wherein the operating element includes a plurality of independent segments interconnected to each other via a linking element, the plurality of independent segments coupled to an outer surface of the track to enable the operating element to move along a length of the track while being restrained from moving away from the track, and wherein the track includes an enlarged outer circumferential edge, each of the plurality of independent segments including an interior cavity arranged and configured to receive the enlarged outer circumferential edge.

12. The architectural-structure covering of claim 11, further comprising a first operating element coupled to the operating system; and a transfer case including a plurality of gears, the first operating element being coupled to a first gear of the plurality of gears in the transfer case;

wherein the operating element coupled to the track is a second operating element, the second operating element being manipulatable by a user, the second operating element being coupled to a second gear of the plurality of gears in the transfer case so that manipulation of the second operating element is transferred to the first operating element to rotate the operating system and the rotatable member for moving the covering between the extended and retracted positions.

* * * * *